United States Patent
Kawahara et al.

(10) Patent No.: US 6,285,092 B1
(45) Date of Patent: Sep. 4, 2001

(54) CABLE APPARATUS

(75) Inventors: Hirokazu Kawahara; Masashige Hagimori, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/399,632

(22) Filed: Sep. 20, 1999

(30) Foreign Application Priority Data

Sep. 21, 1998 (JP) .................................................. 10-266988

(51) Int. Cl.⁷ .................................................. H02J 1/00
(52) U.S. Cl. .................................................. 307/85; 307/43
(58) Field of Search .................................................. 307/85, 86, 43; 710/129; 713/300; 361/683

(56) References Cited

U.S. PATENT DOCUMENTS

| | | | |
|---|---|---|---|
| 5,404,542 | * 4/1995 | Cheung | 395/750 |
| 5,654,593 | * 8/1997 | Murata | 307/86 |
| 5,855,064 | * 1/1999 | Chang | 29/861 |
| 5,890,780 | * 4/1999 | Tomiyori | 307/86 |
| 6,014,750 | * 1/2000 | Williams | 713/300 |
| 6,098,138 | * 8/2000 | Martinelli et al. | 710/129 |

* cited by examiner

*Primary Examiner*—Josie Ballato
*Assistant Examiner*—Sharon Polk
(74) *Attorney, Agent, or Firm*—Jay H. Maioli

(57) ABSTRACT

A cable apparatus makes a selection between supply of an internal power to a predetermined interface device and that of an external power to the interface device in compliance with the interface standard applied to the predetermined interface device. The cable apparatus includes an internal power terminal connectable to an internal power source, a plurality of external power terminals connectable to an external power source, and a plurality of power lines connected to the internal power terminal and/or external power terminals. A power line selection controller is included to select, when an internal power is supplied from the internal power terminal, one of the power lines that allows a connection of the internal power from the internal power terminal to the plurality of external power terminals and when an external power is supplied from any one of the external power terminals, one of the power lines that allows to connect the external power from the external power terminal to the other external power terminals.

4 Claims, 10 Drawing Sheets

CABLE APPARATUS

BACKGROUND OF THE INVENTION

1. Field of the Invention

The present invention relates to a cable apparatus for supplying power from an electronic apparatus to another electronic apparatus, and more particularly, to a cable apparatus for use in connecting a personal computer (will be referred to simply as "PC" hereinafter) to it associated peripheral devices.

2. Description of the Related Art

Generally, the computer system of a PC is configured such that the PC and its associated peripheral devices are connected to each other by a cable apparatus such as a power line via an interface for each of the peripheral devices. The computer system uses a display, keyboard, mouse, printer, modem, etc. as the peripheral devices. Recently, the video camera, electronic still camera and the like have been added to the above-mentioned PC-oriented peripheral devices. Namely, more and more kinds of peripheral devices are used with a PC.

The cable apparatus comprises a cable and a plug connected integrally to either end of the cable. It serves as a transmission path to convey a power and the like from a PC to each peripheral device.

For connection between the PC and each of its associated peripheral devices via the cable apparatus in a computer system, the PC is provided on its enclosure with many connecting terminals such as an analog RGB terminal, digital RGB terminal, etc.

Along with the increase in kind of the above-mentioned peripheral devices and improvement in PC performance in these years, cable apparatuses have been proposed for which plugs and receptacles have been standardized in shape as in the IEEE 1394 high-performance serial bus (will be referred to as "IEEE 1394" hereinafter) for connection of a variety of peripheral devices to a PC via a single interface.

The cable apparatus in conformity with the IEEE 1394 standard has been proposed for a compact design, lower cost, high versatility, etc. It comprises a cable having a power line, etc. and a small plug integrally secured to either end of the cable and having six terminals.

Namely, the cable apparatus conforming to the IEEE 1394 standard can connect power from a PC directly to its associated peripheral devices since it incorporates a power line.

Also, the interface according to the IEEE 1394 standard is characterized in that it can connect a plurality of peripheral devices to a PC and the cable can be connected to, and disconnected from, each of the peripheral devices while the latter is being energized and in operation, that is, in a hot status.

Next, a conventional cable apparatus will be described herebelow with reference to the accompanying drawings:

Referring now to FIG. 1, there is schematically illustrated in the fon-n of a block diagram a conventional cable apparatus adapted to supply both an internal power and an external power. Also, FIGS. 2A and 2B show schematic block diagrams of conventional cable apparatuses, one adapted to supply only an internal power (as in FIG. 2A) and the other adapted to supply only an external power (as in FIG. 2B).

In FIG. 1, the conventional cable apparatus is generally indicated with a reference 120. The cable apparatus 120 comprises a power supply unit 121, Schottky diode 122, fuses 123, 124 and 125, and connectors 126, 127 and 128.

In the cable apparatus 120, the connectors, 126, 127 and 127 should desirably have a high impedance in relation to each other so that they will not influence each other. To supply and receive an external power between these connectors in case no internal power is supplied but the external power is supplied, however, the cable apparatus 120 is constructed as shown in FIG. 1. To pass a current only when the internal power is supplied but no current when no internal power is supplied, the Schottky diode 122 is provided for each bus so that the power supply side works as an anode while each bus works as a cathode.

In the cable apparatus 120, the power supply unit 121 supplies an internal power as will be described below:

As shown in FIG. 1, the power supply unit 121 supplies an internal power through the Schottky diode 122 to the connector 126 via the fuse 123, connector 127 via the fuse 124, and to the connector 128 via the fuse 125, respectively.

Next, the power supply unit 121 which does not supply internal power, namely, in which an external power is supplied from the connectors, will be described below:

At least one (connector 126, 127, 128 for example) of the connectors 126 supplies the external power to the connector 127 via the fuses 123 and 124, and to the connector 128 via the fuse's 123 and 125, respectively.

The connectors 127 and 128 supply the external power to other connectors in the same manner as the connector 126. The external power may be supplied to more than one of the connectors 126 to 128. When no internal power is supplied, the connectors supply and receive an external power between them as in the above.

In FIG. 2A, the convention cable apparatus is generally indicated with a reference 130. The cable apparatus 130 comprises a power supply unit 131, fuse 132, Schottky diodes 133, 134 and 135, and connectors 136, 137 and 138.

In the cable apparatus 130, each of the connectors 136 to 138 has a higher impedance than the others. That is, the cable apparatus 130 is an ideal one in which an internal power can be supplied at a higher impedance at one of the connectors than the others.

In the cable apparatus 130, the power supply unit 131 supplies an internal power as will be described below:

As shown in FIG. 2A, the power supply unit 131 supplies an internal power to the connector 136 via the fuse 132 and Schottky diode 133, connector 137 via the fuse 132 and Schottky diode 134 and to the connector 138 via the fuse 132 and Schottky diode 135, respectively.

However, when the power supply unit 131 supplies no internal power but an external power is supplied at the connectors 136, 137 and 138, the power will not flow from the connectors 136, 137 and 138 to the fuse 132 because of the Schottky diodes 133, 134 and 135, so that the connectors 136, 137 and 138 cannot supply and receive the external power between them.

Therefore, in the cable apparatus 130, the connectors cannot supply any external power to one another.

Finally, a cable apparatus having no internal power source, namely, in which an external power is supplied from the connectors of the cable apparatus, will be described below:

In FIG. 2B, the conventional cable apparatus is generally indicated with a reference 140. The cable apparatus 140 comprises fuses 141 and 142 and connectors 143, 144 and 145.

In this conventional cable apparatus 140, at least one (connector 143 for example) of the connectors 143 to 145 can supply an external power to the connector 144 via the fuse 141, and to the connector 145 via the fuses 141 and 142, as shown in FIG. 2B.

The connectors 144 and 145 supply the external power to other connectors in the same manner as the connector 143. The external power may be supplied to more than one of the connectors 143 to 145. Thus in this cable apparatus 140, no internal power can be supplied but the connectors 144 to 145 can supply and receive an external power between them.

Since in the cable apparatus 140, the connectors 143 to 145 are connected to each other by means of fuses 141 and 142, respectively, when an external power is supplied to the connectors 143, 144 and 145, it can be supplied and received between the connectors and delivered from them to outside.

However, the conventional cable apparatuses do not strictly meet the requirements for power supply prescribed in the interface standard. In many of the conventional cable apparatuses, priority is given to reception of an external power. Thus, the conventional cable apparatuses are disadvantageous in that when an internal power is supplied, each bus will not have a high impedance in relation to each other.

Also, in the conventional cable apparatuses, the setting of power class conforming to the requirements in the IEEE 1394 standard are not automatically changed but the user has to change the setting using a switch on the keyboard or using GUI, a command or the like. Thus, failure to change a power class setting results in setting of a power class for supply of an external power or setting of quite a different power class setting from a required one.

OBJECT AND SUMMARY OF THE INVENTION

Accordingly the present invention has an object to overcome the above-mentioned drawbacks of the prior art by providing a cable apparatus adapted to make a selection between supply of an internal power to a predetermined interface device and that of an external power to the interface device in compliance with the interface standard applied to the predetermined interface device.

The above object can be attained by providing a cable apparatus comprising, according to the present invention:
  an internal power terminal connectable to an internal power source;
  a plurality of external power terminals connectable to an external power source;
  a plurality of power lines connected to the internal power source and/or external power sources; and
  a power line selection controlling means for selecting, when an internal power is supplied from the internal power terminal, one of the power line that allows to connect the internal power from the internal power terminal to the plurality of external power terminals, and when the external power is supplied from any one of the external power terminals, one of the power lines that allows to connect the external power from the external power terminal to the other external power terminals.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

The present invention is applied to a power supply node circuit conforming to the IEEE 1394 standard.

Figure 1:
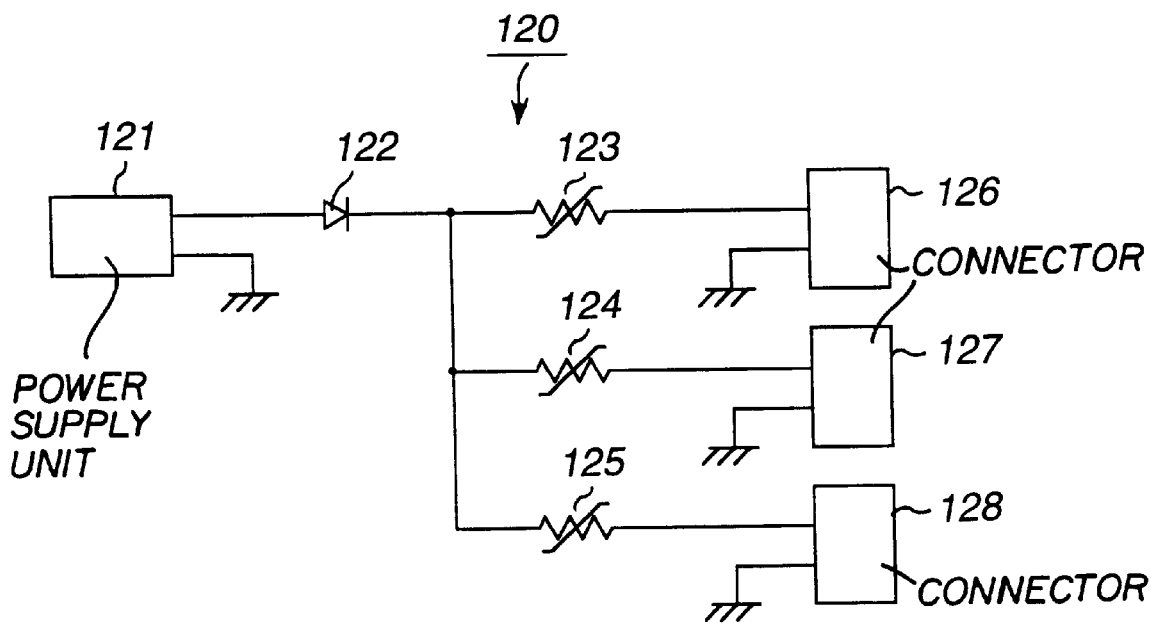
FIG. 1 is a schematic block diagram of a conventional cable apparatus which is adapted to supply both an internal power and an external power.
Figure 2A:
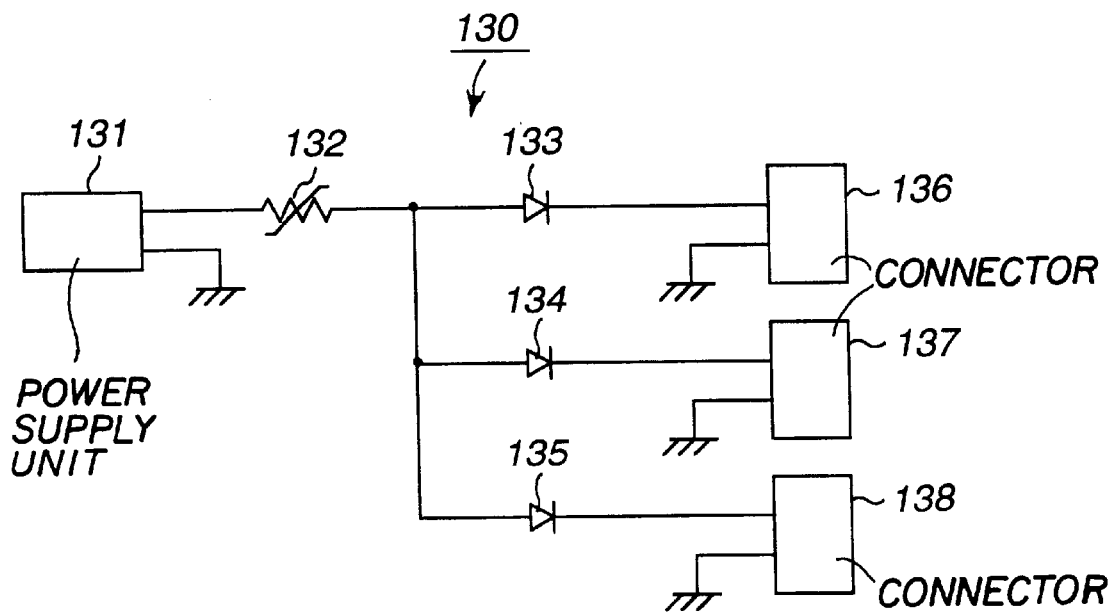
FIGS. 2A and 2B shows schematic block diagrams of conventional cable apparatuses, one adapted to supply only an internal power and the other adapted to supply only an external power.
Figure 2B:
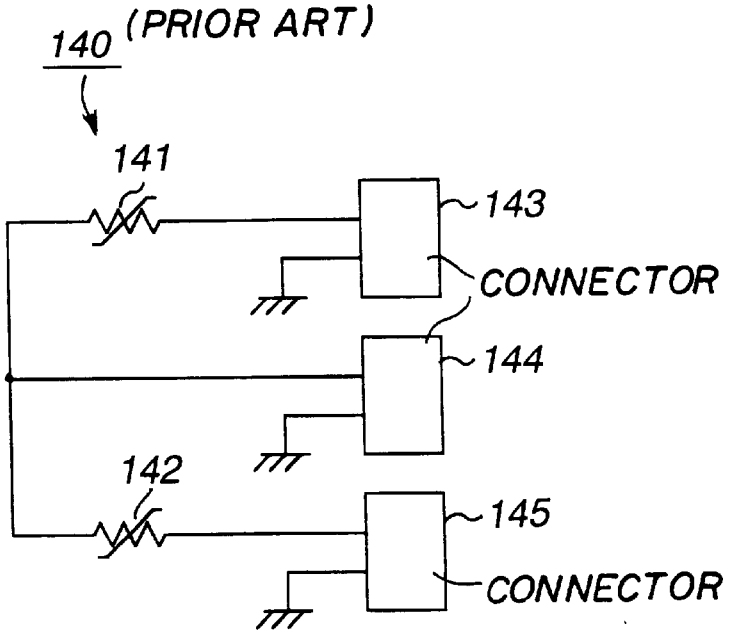
Figure 3:
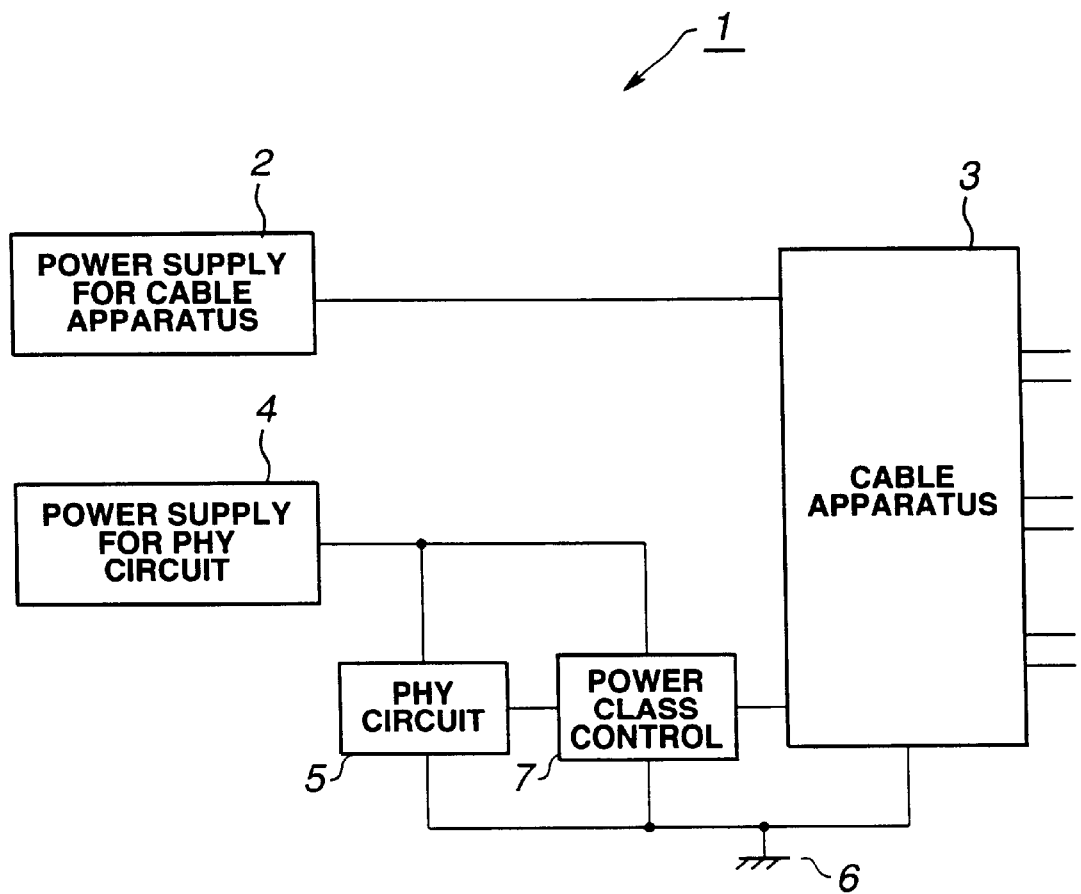
FIG. 3 is a schematic block diagram of a power supply node circuit according to the present invention.

Referring now to FIG. 3, there is schematically illustrated in the form of a block diagram an embodiment of power supply node circuit according to the present invention. The power supply node circuit is generally indicated with a reference 1.

As shown in FIG. 3, the power supply node circuit comprises a power supply unit 2, a cable apparatus 3 which is supplied with power from the cable apparatus-oriented power supply unit 2, a power supply unit 4, a physical interface circuit 5 (will be referred to as "PHY circuit" hereinafter) which is supplied with power from the power supply unit 4, a grounding terminal 6 to connect the cable apparatus 3, PHY circuit 5 to a ground potential, and a power class controller 7 which is supplied with a provider flag signal indicative of whether the cable apparatus 3 is supplied with the power from the cable apparatus-oriented cable apparatus 3 to the power supply unit 2 and also supplied with the power from the PHY circuit-oriented power supply unit 4, to supply an output signal of a power class to the PHY circuit 5. The power class controller 7 is also connected to the grounding terminal 6 and thus grounded by the latter.

Figure 4:
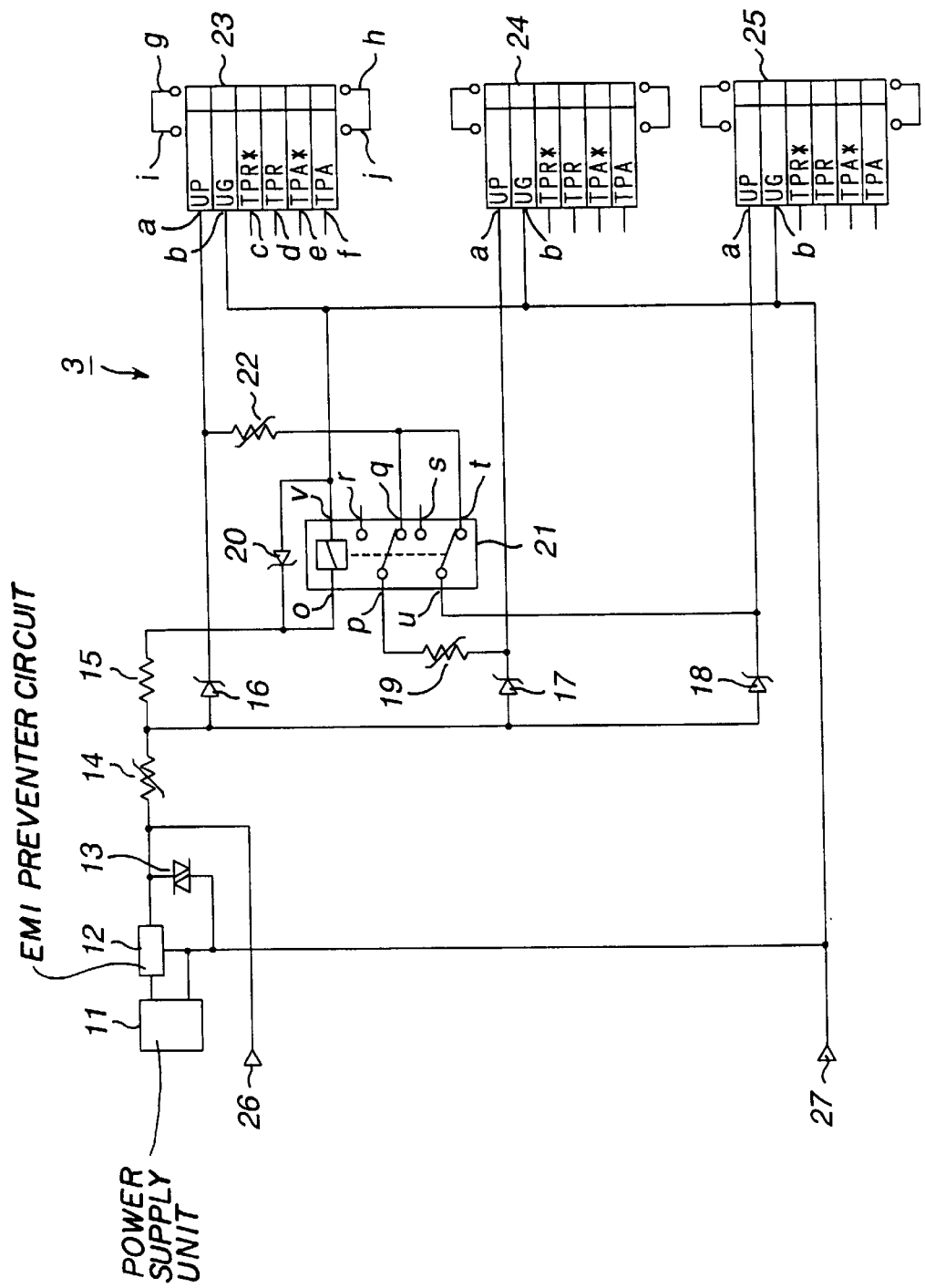
FIG. 4 is a wiring diagram of a first embodiment of cable apparatus according to the present invention.

FIG. 4 is a wiring diagram of a first embodiment of the cable apparatus 3 included in the embodiment of power supply node circuit I according to the present invention.

As will be seen from FIG. 4, the cable apparatus 3 comprises a power supply jack 11 connected to the cable apparatus-oriented power supply unit 2, an electromagnetic interference (EMI) preventive circuit 12 connected to the power supply jack 11, an semiconductor resistive element (will be referred to as "varistor" hereinafter) 13 connected to the EMI preventive circuit 12 to pass an overvoltage, and a positive-going resistive element 14 (will be referred to as "fuse" hereinafter) connected to the varistor 13.

The cable apparatus 3 further comprises a resistor 15 connected to the fuse 14, Schottky diodes 16, 17 and 18 connected at the anode thereof to the fuse 14, a fuse 19, a Schottky diode 20 connected at the cathode thereof to the resistor 15, a relay circuit 21 having a terminal o connected to the resistor 15, terminal p connected to the fuse 19, terminal u connected to the cathode of the Schottky diode 18 and terminals q and t, and a fuse 22 connected to the terminals q and t of the relay circuit 21.

Figure 5:
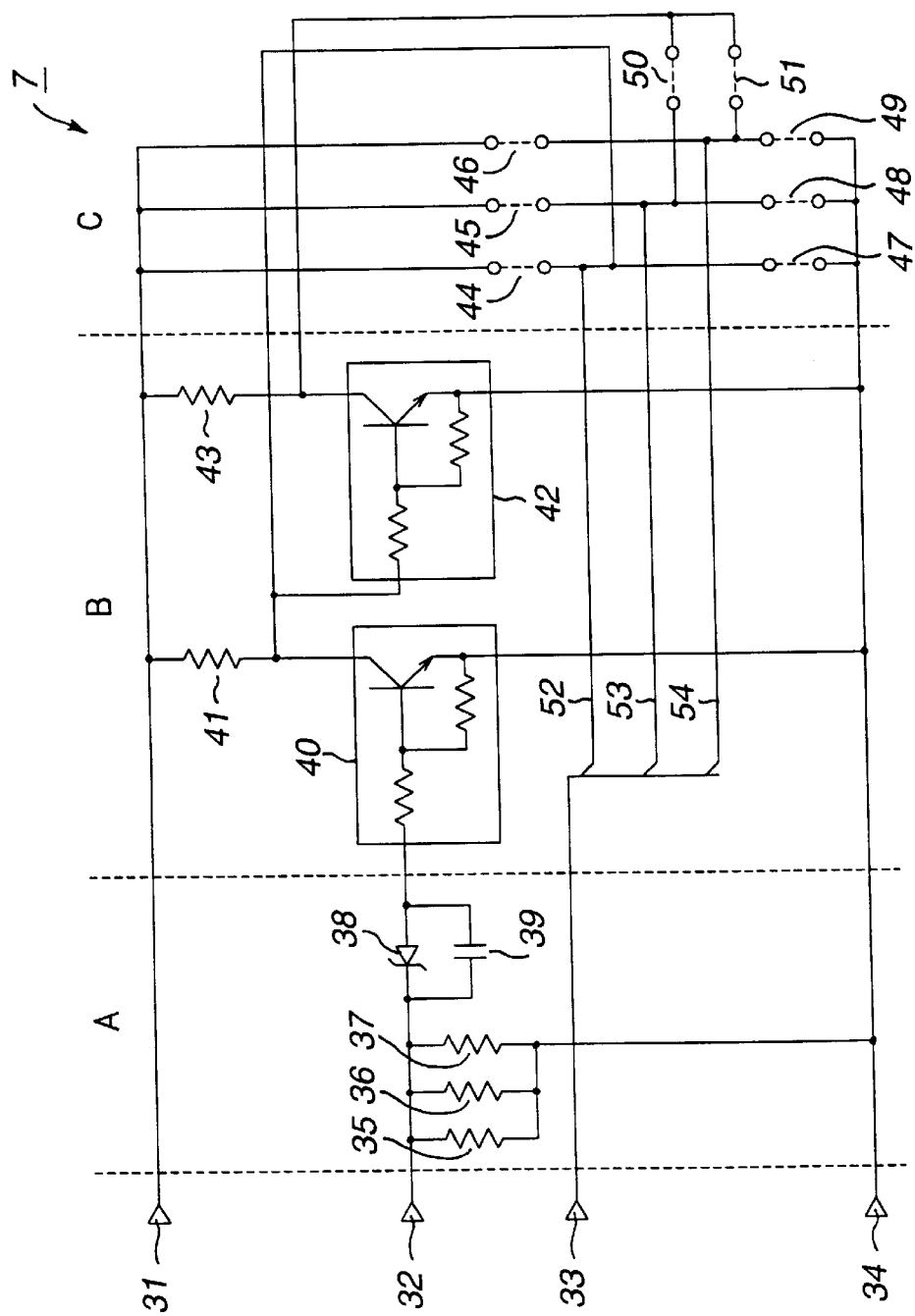
FIG. 5 is a wiring diagram of a power class controller used along with the first embodiment of cable apparatus according to the present invention.

Moreover, the cable apparatus 3 comprises a connector 23 connected to the cathode of the Schottky diode 16 and the fuse 22, connector 24 connected to the cathode of the Schottky diode 17, connector 25 connected to the cathode of the Schottky diode 18, provider flag terminal 26 connected to a provider flag terminal 32 of the power class controller 7 shown in FIG. 5, and a grounding terminal 27 connected to the grounding terminal 6.

Note that the voltage of the cable apparatus-oriented power supply unit 2 connected to the power supply jack 11 should be within the voltage range prescribed in the IEEE 1394 standard. To supply a necessary and sufficient current on which the relay circuit 21 not meeting the voltage range specified in the IEEE 1394 standard can operate, however, the resistor 15 is connected to the fuse 14 and the terminal o of the relay circuit 21.

The Schottky diode 20 is provided to prevent a counter-electromotive force (CEMF) from being developed during operation of the relay circuit 21. The CEMF will, if present, destroy or adversely affect all the circuits and devices.

Note that in the initial status where no internal power is supplied to the relay coil, the terminals p and u of the relay circuit 21 are electrically connected to the terminals q and t, respectively.

The cable apparatus 3 constructed as having been described in the foregoing functions as will be described below:

First, when the power supply jack 11 is plugged in the cable apparatus-oriented power supply unit 2, a current flows to the relay coil via the power supply jack 11, EMI preventive circuit 12 which suppresses an external electro-magnetic field which will have an adverse influence on the circuits and parts of the apparatus, fuse 14 and the resistor 15, whereby an internal power is supplied to the terminal o of the relay circuit 21 which shifts the switch from one position to another.

The varistor 13 connected to the EMI preventive circuit 12 which suppresses the influence of the external electro-magnetic field on the apparatus circuits and parts and to the fuse 14 is provided to protect the apparatus circuits and parts from being destroyed due to a thunder or overvoltage, if applied.

When the power supply jack 11 is plugged in the cable apparatus-oriented power supply unit 2, the latter supplies the internal power to the terminal p of the relay circuit 21 via the power supply jack 11, EMI preventive circuit 12, fuse 14, Schottky diode 17 and the fuse 19.

Also, when the power supply jack 11 is plugged in the cable apparatus-oriented power supply unit 2, the latter supplies the internal power to the terminal u of the relay circuit 2 1 via the power supply jack 11, EMI preventive circuit 12, fuse 14 and the Schottky diode 18.

Also, when the power supply jack 11 is plugged in the cable apparatus oriented power supply unit 2, the latter supplies the internal power to the terminal a of the connector 23 via the power supply jack 11, EMI preventive circuit 12, fuse 14 and the Schottky diode 16, to the terminal a of the connector 24 via the power supply jack 11, EMI preventive circuit 12, fuse 14 and the Schottky diode 17, and to the terminal a of the connector 25 via the power supply jack 11, EMI preventive circuit 12, fuse 14 and the Schottky diode 18, respectively.

In this case, the relay circuit 21 has the relay coil thereof energized with the supplied internal power to shift each of the switches from one position to another for the terminals p and u to be electrically connected to the terminals r and s, respectively. As the switches are thus shifted, the terminals a of the connectors 23, 24 and 25 of each bus, respectively, are not electrically connected to the power supply jack 11 via the relay circuit 21. That is to say, the internal power from the power supply jack 11 is supplied to the terminals a of the connectors 23, 24 and 25 only via the Schottky diodes 16, 17 and 18.

When the power supply jack 11 is not plugged in the cable apparatus-oriented power supply unit 2, the latter will not supply the internal power to each terminal of the relay circuit 21 along the same route as in the above.

In this case, since no internal power is supplied to the relay coil of the relay circuit 21, the switches are kept initially closed so that the terminals p and u are electrically connected to the terminals 9 and t, respectively. Since the switches remain in their initial status, the terminals a of the connectors 23, 24 and 25 of each bus are electrically connected to the terminals a of the connectors 23, 24 and 25.

When the connector 23, for example, is supplied with an external power, it delivers the external power at the terminal . thereof to the terminal a of the connector 24 via the fuse 22, terminals q and p of the relay circuit 21 and the fuse 19, and to the terminal a of the connector 25 via the fuse 22, terminals t and u of the relay circuit 21, respectively.

Thus, when supplied with an external power, each of the connectors 23, 24 and 25 can supply and receive the external power between them and further deliver it to outside.

Therefore, the connectors 23, 24 and 25 can supply and receive a power between predetermined interface devices.

FIG. 5 is a wiring diagram of the power class controller 7, showing in detail the construction thereof.

As shown in FIG. 5, the power class controller 7 comprises a power terminal 31 connected to the PHY circuit-oriented power supply unit 4, a provider flag terminal 32 connected to the provider flag terminal 26 shown in FIG. 4, a power class output terminal group 33 connected to the PHY circuit 5, and a grounding terminal 34 connected to the grounding terminal 6.

The power class controller 7 further comprises resistors 35, 36 and 37 connected to the provider flag terminal 32 and also connected in parallel to each other, a Zener diode 38 connected at the cathode thereof to the provider flag terminal 32, and a capacitor 39 connected to the provider flag terminal 32 and also connected in parallel to the Zener diode 38 to kill any noise produced by the Zener diode 38 in operation. It should be noted that this circuit section of the power class controller 7 will be referred to hereinafter as a malfunction preventive circuit A which prevents the power class controller 7 from being caused to malfunction by a leakage current from the Schottky diodes 16, 17 and 18 when the external power is connected to the connectors, namely, to assure the positive operation of the power class controller 7.

It should be noted that the Zener voltage of the Zener diode 38 should be higher than the voltage dropped across the resistors 35, 36 and 37 while being lower than the lowest voltage prescribed in the IEEE 1394 standard or a voltage of the cable apparatus-oriented power supply unit 2.

In addition, the power class controller 7 comprises a transistor 40 connected at the base thereof to the anode of the Zener diode 38 and capacitor 39 and at the emitter thereof to the grounding terminal 34, a resistor 41 connected to the power terminal 31 and collector of the transistor 40, a transistor 42 connected at the base thereof to the resistor 41 and at the emitter thereof to the grounding terminal 34, and a resistor 43 connected to the power terminal 31 and collector of the transistor 42. It should be noted that this circuit section of the power class controller 7 will be referred to hereinafter as a theoretical value generation circuit B which generates a theoretical value for a power class.

Moreover, the power class controller 7 has jumpers 44, 45 and 46 connected to the power terminal 31, a jumper 47 connected to the jumper 44 and resistor 41, a jumper 48 connected to the jumper 45 and a jumper 50 also connected to the resistor 43, a jumper 49 connected to the jumper 46 and a jumper 51 also connected to the resistor 43, and wires 52, 53 and 54 connected to the power class output terminal group 33 and also connected in parallel to each other.

It should be noted that this circuit section of the power class controller 7 will be referred to hereinafter as a power class setting circuit C which sets a power class in compliance with the IEEE 1394 standard.

To use a power class setting in a fixed manner or to cope with changes of all power class settings, the power class setting circuit C is adapted such that is can be short-circuited to a logic power source and grounding terminal and provider flags H and L can be input to the power terminal 31, power class output terminal 33 and grounding terminal 34.

The cable apparatus functions depending upon a power class setting conforming to the IEEE 1394 standard as will be described below:

When a power class of "000" is set, the cable apparatus is supplied with neither internal power nor external power.

When a power class of "001" is set, the cable apparatus is supplied with an internal power of at least 15 W.

When a power class of "010" is set, the cable apparatus is supplied with an internal power of at least 30 W.

When a power class of "011" is set, the cable apparatus is supplied with an internal power of at least 45 W.

When a power class of "100" is set, the cable apparatus is supplied with no internal power but with an external power. In this case, the cable apparatus operates on the external power supplied over the bus and consumes a maximum of 1 W of the external power.

When a power class of "101" is set, the cable apparatus is supplied with no internal power but with an external power. In this case, the cable apparatus operates on the external power supplied over the bus and consumes a maximum of 1 W of the external power. To activate a link, an additional power of 2 W is required.

When a power class of "101" is set, the cable apparatus is supplied with no internal power but with an external power. In this case, the cable apparatus operates on the external power supplied over the bus and consumes a maximum of 1 W of the external power. To activate the link, an additional power of 5 W is required.

When a power class of "111" is set, the cable apparatus is supplied with no internal power but with an external power. In this case, the cable apparatus operates on the external power supplied over the bus and consumes a maximum of 1 W of the external power. To activate the link, an additional power of 9 W is required.

Four "installed" or "not-installed" states of the components including from the transistor 40 to the jumper 51 of the power class controller 7 will be described below. Note that the "installed" status of a component means that the component is in operation while the "not-installed" status of a component means that the component is not in operation.

When the cable apparatus-oriented power supply unit 2 can supply the terminals a of the connectors 23, 24 and 25 with an internal power of 15 W, the output of the power class output terminal group 33 is set for an output "001".

When the transistor 40, resistor 41, transistor 42, resistor 43, and jumpers 48 and 51 are in the installed status while the jumpers 44 to 47 and jumpers 49 and 50 are in the not-installed status, the power class controller 7 will set the power class of "001" for the power class output terminal group 33 to supply a power class output which will allow the cable apparatus-oriented power supply unit 2 to supply an internal power of 15 W to the terminals a of the connectors 23, 24 and 25.

Figure 6:
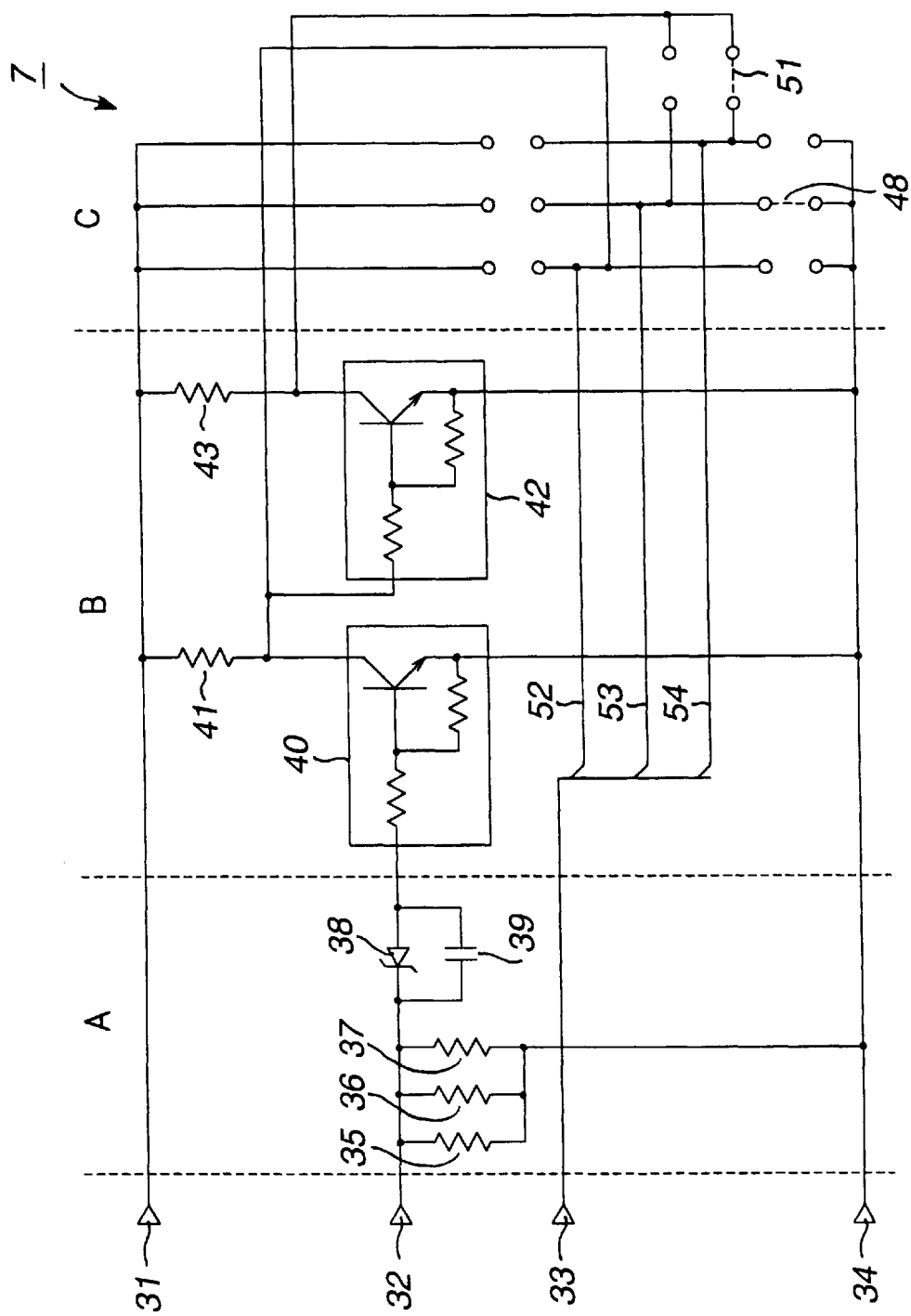
FIG. 6 is a wiring diagram of a variant of the power class controller in FIG. 5.

The above operation will be described below with reference to FIG. 6. The provider flag terminal 32 is supplied with an internal power from the cable apparatus-oriented power supply unit 2. Thus, the voltage is applied to the cathode of the Zener diode 38 and the resistors 35, 36 and 37. Since these resistors 35, 36 and 37 are adapted for a small drop of the voltage, this voltage is also applied to the anode of the Zener diode 38. Since the transistor 40 is applied with the voltage because the anode of the Zener diode 38 is connected to the base of the transistor 40, it is turned on. The collector of the transistor 40 will be at the same potential as the grounding terminal 34 since the transistor 40 is on. Therefore, the collector of the transistor 40 takes a potential which will be developed when the power class is set to "0".

Since the transistor 40 is on, the base of the transistor 42 connected to the collector of the transistor 40 is at the same potential as the grounding terminal 34. Thus, the transistor 42 will be off. The collector of the transistor 42 has the same potential as the power terminal 31 since the power voltage from the power terminal 31 passes through the resistor 43 because the transistor 42 is off. Therefore, the collector of the transistor 42 takes a potential which will be developed when the power class is set to "1".

Since the wire 52 of the power class output terminal group 33 is connected to the collector of the transistor 40, it provides an output "0". The wire 53 of the power class output terminal group 33 is connected to the grounding terminal 34 via the jumper 48 and thus provides an output "0". Since the wire 54 of the power class output terminal group 33 is connected to the collector of the transistor 42 via the jumper 51, it provides an output "1".

Therefore, the power class output terminal group 33 will provide an output "001", and thus the power class is known to be appropriately set.

In case the cable apparatus-oriented power supply unit 2 cannot supply an internal power of 15 W to the terminals a of the connectors 23, 24 and 25 depending upon whether the relevant components are in the "installed" or "not-installed" status, the power class output terminal group 33 is set for an output "100".

The operation for this setting will be described with reference to FIG. 6. When the cable apparatus-oriented power supply unit 2 can supply no internal power, the provider flag terminal 32 will not be applied with any voltage. Therefore, the cathode of the Zener diode 38 will have the same potential as the grounding terminal 34 since it is connected to the grounding terminal 34 via the resistors 35, 36 and 37. The transistor 40 will be off because its base is at the same potential as the grounding terminal 34.

Therefore, the collector of the transistor 40 takes a potential which will be developed when the power class is set to "1".

The base of the transistor 42 connected to the collector of the transistor 40 is at the same potential as the power terminal 31 since the power voltage from the power terminal 31 passes through the resistor 41 because the transistor 40 is off. The transistor 42 will be on since it is applied at its base with the power voltage from the power terminal 31. Thus, the collector of the transistor 42 will be at the same potential as the grounding terminal 34. Therefore, the collector of the transistor 42 takes a potential which will be developed when the power class is set to "0".

Since the wire 52 of the power class output terminal group 33 is connected to the collector of the transistor 40, it provides an output "1". The wire 53 of the power class output terminal group 33 is connected to the grounding terminal 34 via the jumper 48 and thus provides an output "0". Since the wire 54 of the power class output terminal group 33 is connected to the collector of the transistor 42 via the jumper 51, it provides an output "0".

Therefore, the power class output terminal group 33 provide an output "100", and thus the power class is known to be appropriately set.

When the cable apparatus-oriented power supply unit 2 can supply an internal power of 30 W to the terminals a of the connectors 23, 24 and 25, the power class output terminal group 33 is set for an output "010".

When in the power class controller 7, the transistor 40, resistor 41, transistor 42, resistor 43, and jumpers 49 and 50 are in the "installed" status while the jumpers 44 to 48 and jumper 51 are in the "not-installed" status, the power class output terminal group 33 is set for an output "010" which allows the cable apparatus-oriented power supply unit 2 to supply the internal power of 30 W to the terminals a of the connectors 23, 24 and 25.

Figure 7:
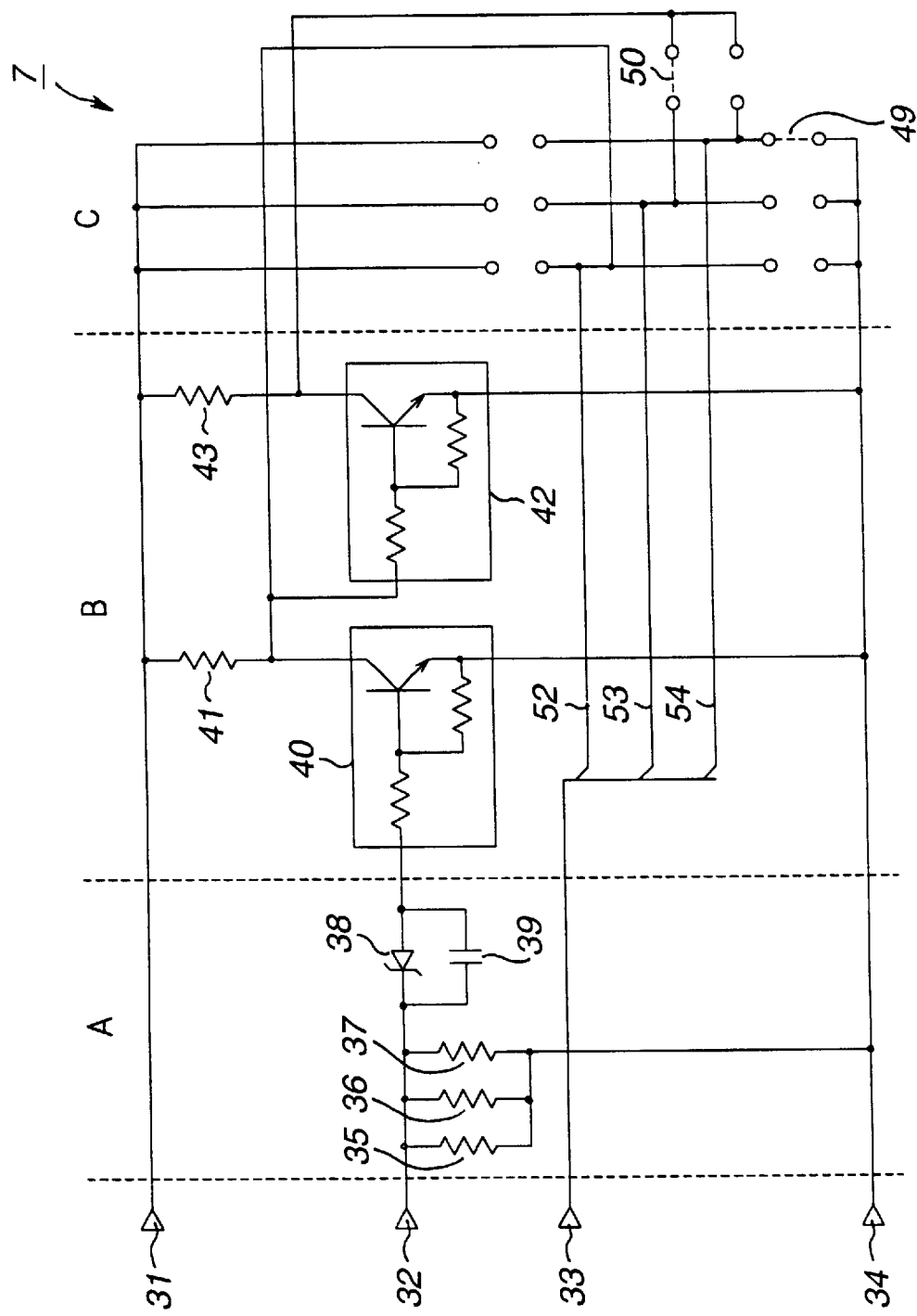
FIG. 7 is a wiring diagram of another variant of the power class controller in FIG. 5.

The above operation will be described below with reference to FIG. 7. The provider flag terminal 32 is supplied with an internal power from the cable apparatus-oriented power supply unit 2. Thus, the voltage is applied to the cathode of the Zener diode 38 and the resistors 35, 36 and 37. Since these resistors 35, 36 and 37 are adapted for a small drop of the voltage, this voltage is also applied to the anode of the Zener diode 38. Since the transistor 40 is applied with the voltage because the anode of the Zener diode 38 is connected to the base of the transistor 40, it is turned on. The collector of the transistor 40 will be at the same potential as the grounding terminal 34 since the transistor 40 is on. Therefore, the collector of the transistor 40 takes a potential which will be developed when the power class is set to "0".

Since the transistor 40 is on, the base of the transistor 42 connected to the collector of the transistor 40 is at the same potential as the grounding terminal 34. Thus, the transistor 42 will be off The collector of the transistor 42 has the same potential as the power terminal 31 since the power voltage from the power terminal 31 passes through the resistor 43 because the transistor 42 is off. Therefore, the collector of the transistor 42 takes a potential which will be developed when the power class is set to "1".

Since the wire 52 of the power class output terminal group 33 is connected to the collector of the transistor 40, it provides an output "0". The wire 53 of the power class output terminal group 33 is connected to the collector of the transistor 42 via the jumper 50 and thus provides an output "1". Since the wire 54 of the power class output terminal group 33 is connected to the grounding terminal 34 via the jumper 49, it provides an output "0".

Therefore, the power class output terminal group 33 will provide an output "010", and thus the power class is known to be appropriately set.

The power class controller 7 comprises resistors 35, 36 and 37 connected to the provider flag terminal 32 and also connected in parallel to each other, the Zener diode 38 connected at the cathode thereof to the provider flag terminal 32, and the capacitor 39 connected to the provider flag terminal 32 and also connected in parallel to the Zener diode 38 to kill any noise developed by the Zener diode 38 in operation. It should be reminded that this circuit section of the power class controller 7 will be referred to hereinafter as a malfunction preventive circuit A which prevents the power class controller 7 from being caused to malfunction by a leakage current from the Schottky diodes 16, 17 and 18 when the external power is connected to the connectors, namely, to assure the positive operation of the power class controller 7.

It should be noted that the Zener voltage of the Zener diode 38 should be higher than the voltage dropped across the resistors 35, 36 and 37 while being lower than the lowest voltage prescribed in the IEEE 1394 standard or a voltage of the cable apparatus-oriented power supply unit 2.

The power class controller 7 comprises the transistor 40 connected at the base thereof to the anode of the Zener diode 38 and capacitor 39, at the collector thereof to the resistor 41 and at the emitter thereof to the grounding terminal 34, the resistor 41 being connected to the power terminal 31, and the transistor 42 connected at the base thereof to the resistor 41, at the collector thereof to the resistor 43 and at the emitter thereof to the grounding terminal 34, the resistor 43 being also connected to the power terminal 31. It should be noted that this circuit section of the power class controller 7 will be referred to hereinafter as a theoretical value generation circuit B which generates a theoretical value for a power class.

The power class controller 7 has the jumpers 44, 45 and 46 connected to the power terminal 31, a jumper 47 connected to the jumper 44 and resistor 41, a jumper 48 connected to the jumper 45 and a jumper 50 connected to the resistor 43, a jumper 49 connected to the jumper 46 and a jumper 51 connected to the resistor 43, and wires 52, 53 and 54 connected to the power class output terminal group 33 and also connected in parallel to each other.

In case the cable apparatus-oriented power supply unit 2 cannot supply an internal power of 30 W to the terminals a of the connectors 23, 24 and 25 depending upon whether the relevant components are in the "installed" or "not-installed" status, the power class output terminal group 33 is set for an output "100".

The operation for this setting will be described with reference to FIG. 7. When the cable apparatus-oriented power supply unit 2 can supply no internal power, the provider flag terminal 32 will not be applied with any voltage. Therefore, the cathode of the Zener diode 38 will have the same potential as the grounding terminal 34 since it is connected to the grounding terminal 34 via the resistors 35, 36 and 37. The transistor 40 will be off because its base is at the same potential as the grounding terminal 34. Therefore, the collector of the transistor 40 takes a potential which will be developed when the power class is set to "1".

The base of the transistor 42 connected to the collector of the transistor 40 is at the same potential as the power terminal 31 since the power voltage from the power terminal 31 passes through the resistor 41 because the transistor 40 is off. The transistor 42 will be on since it is applied at its base with the power voltage from the power terminal 31. Thus, the collector of the transistor 42 will be at the same potential as the grounding terminal 34. Therefore, the collector of the transistor 42 takes a potential which will be developed when the power class is set to "0".

Since the wire 52 of the power class output terminal group 33 is connected to the collector of the transistor 40, it provides an output "1". The wire 53 of the power class output terminal group 33 connected to the collector of the transistor 42 via the jumper 50 provides an output "0". Since the wire 54 of the power class output terminal group 33 is connected to the grounding terminal 34 via the jumper 49, it provides an output "0".

Therefore, the power class output terminal group 33 provide an output "100", and thus the power class is known to be appropriately set.

When the cable apparatus-oriented power supply unit 2 can supply an internal power of 45 W to the terminals a of the connectors 23, 24 and 25, the power class output terminal group 33 is set for an output "011".

When in the power class controller 7, the transistor 40, resistor 41, transistor 42, resistor 43, and jumpers 50 and 51 are in the "installed" status while the jumpers 44 to 49 are in the "not-installed" status, the power class output terminal group 33 is set for an output "011" which allows the cable apparatus-oriented power supply unit 2 to supply the internal power of 45 W to the terminals a of the connectors 23, 24 and 25.

Figure 8:
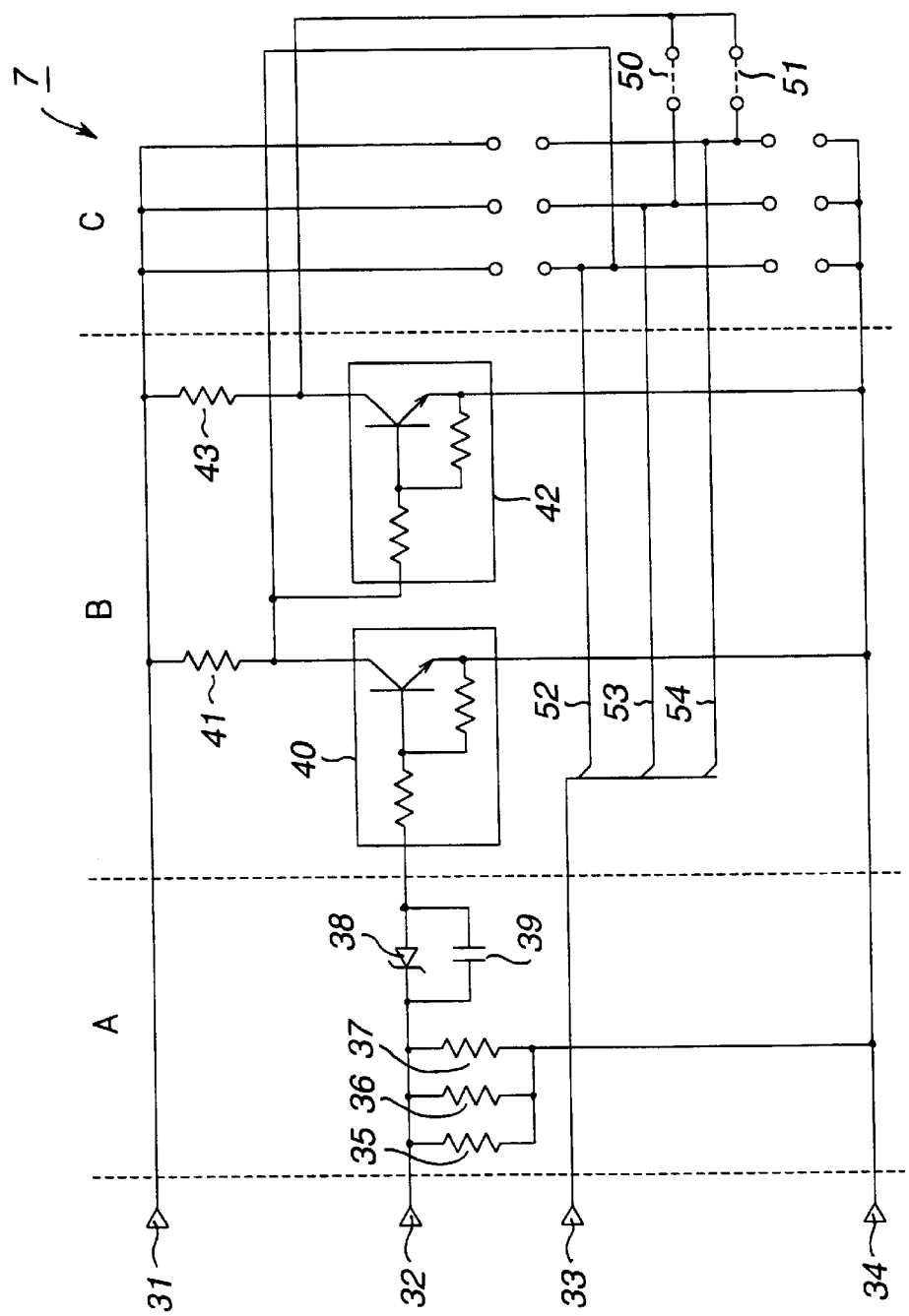
FIG. 8 is a wiring diagram of a still another variant of the power class controller in FIG. 5.

The above operation will be described below with reference to FIG. 8. The provider flag terminal 32 is supplied with an internal power from the cable apparatus-oriented power supply unit 2. Thus, the voltage is applied to the cathode of the Zener diode 38 and the resistors 35, 36 and 37. Since these resistors 35, 36 and 37 are adapted for a small drop of the voltage, this voltage is also applied to the anode of the Zener diode 38. Since the transistor 40 is applied with the voltage because the anode of the Zener diode 38 is connected to the base of the transistor 40, it is turned on. The collector of the transistor 40 will be at the same potential as the grounding terminal 34 since the transistor 40 is on. Therefore, the collector of the transistor 40 takes a potential which will be developed when the power class is set to "0".

Since the transistor 40 is on, the base of the transistor 42 connected to the collector of the transistor 40 is at the same potential as the grounding terminal 34. Thus, the transistor 42 will be off. The collector of the transistor 42 has the same potential as the power terminal 31 since the power voltage from the power terminal 31 passes through the resistor 43 because the transistor 42 is off. Therefore, the collector of the transistor 42 takes a potential which will be developed when the power class is set to "1".

Since the wire 52 of the power class output terminal group 33 is connected to the collector of the transistor 40, it provides an output "0". The wire 53 of the power class output terminal group 33 connected to the collector of the transistor 42 via the jumper 50 provides an output "1". Since the wire 54 of the power class output terminal group 33 is connected to the collector of the transistor 42 via the jumper 51, it provides an output "1".

Therefore, the power class output terminal group 33 will provide an output "011", and thus the power class is known to be appropriately set.

In case the cable apparatus-oriented power supply unit 2 cannot supply an internal power of 45 W to the terminals a of the connectors 23, 24 and 25 depending upon whether the relevant components are in the "installed" or "not-installed" status, the power class output terminal group 33 is set for an output "100".

The operation for this setting will be described with reference to FIG. 8. When the cable apparatus-oriented power supply unit 2 can supply no internal power, the provider flag terminal 32 will not be applied with any voltage. Therefore, the cathode of the Zener diode 38 will have the same potential as the grounding terminal 34 since it is connected to the grounding terminal 34 via the resistors 35, 36 and 37. The transistor 40 will be off because its base is at the same potential as the grounding terminal 34. Therefore, the collector of the transistor 40 takes a potential which will be developed when the power class is set to "1".

The base of the transistor 42 connected to the collector of the transistor 40 is at the same potential as the power terminal 31 since the power voltage from the power terminal 31 passes through the resistor 41 because the transistor 40 is off. The transistor 42 will be on since it is applied at its base with the power voltage from the power terminal 31. Thus, the collector of the transistor 42 will be at the same potential as the grounding terminal 34. Therefore, the collector of the transistor 42 takes a potential which will be developed when the power class is set to "0".

Since the wire 52 of the power class output terminal group 33 is connected to the collector of the transistor 40, it provides an output "1". The wire 53 of the power class output terminal group 33 connected to the collector of the transistor 42 via the jumper 50 provides an output "0". Since the wire 54 of the power class output terminal group 33 is connected to the collector of the transistor 42 via the jumper 51, it provides an output "0".

Therefore, the power class output terminal group 33 provide an output "100", and thus the power class is known to be appropriately set.

Figure 9:
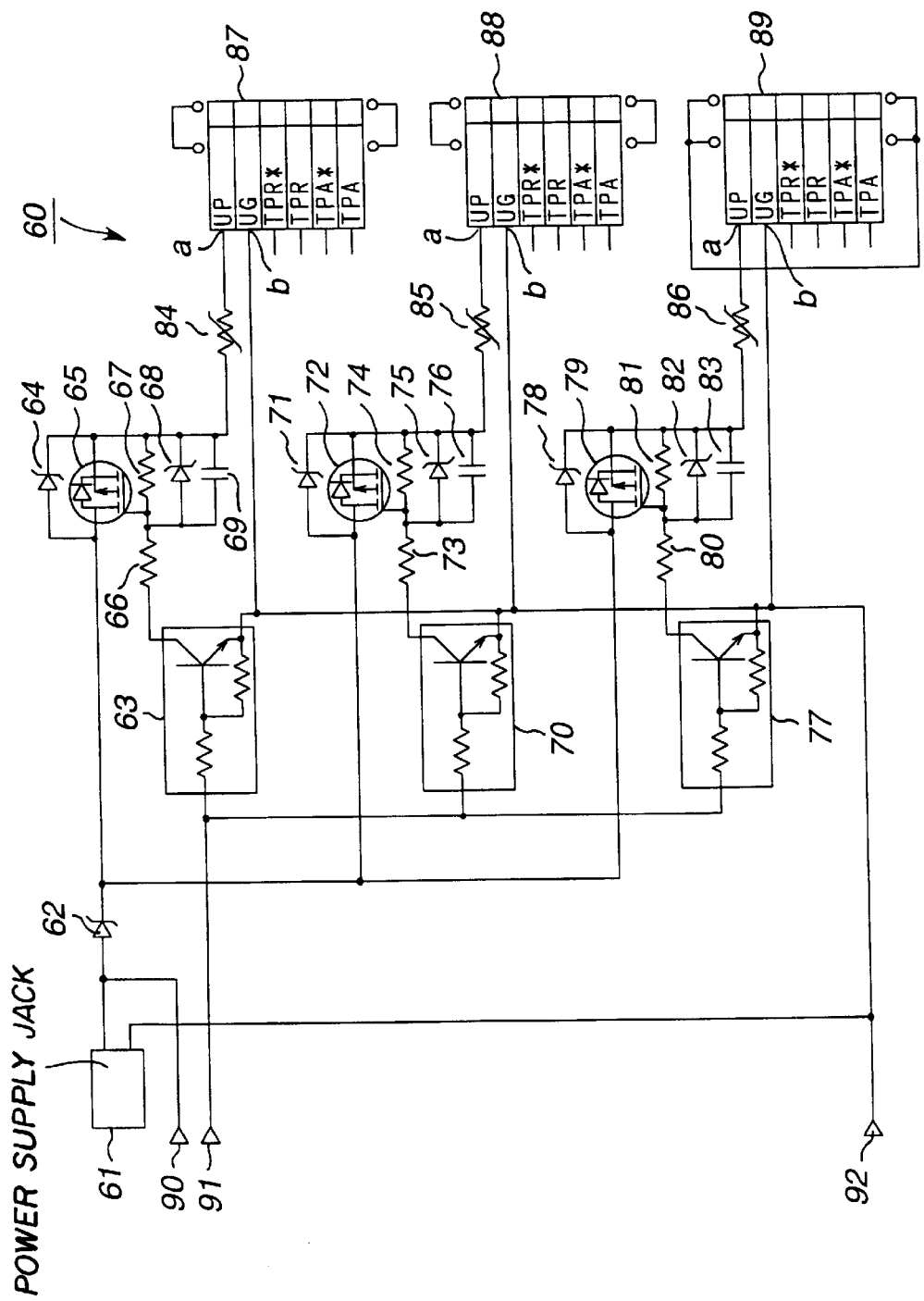
FIG. 9 is a wiring diagram of a second embodiment of cable apparatus according to the present invention.

FIG. 9 is a wiring diagram of the second embodiment of cable apparatus included in the power supply anode circuit 1 according to the present invention. The cable apparatus is generally indicated with a reference 60.

Note that the cable apparatus 60 stands for the cable apparatus 3 having been described in the foregoing with reference to FIG. 3.

As shown in FIG. 9, the cable apparatus 60 comprises a power supply jack 61 connected to the cable apparatus-oriented power supply unit 2, and a Schottky diode 62 connected at the anode thereof to the power supply jack 61.

The cable apparatus 60 further comprises a transistor 63 connected at the base thereof to an FET controller 91, at the collector thereof to a resistor 66 and at the emitter thereof to a grounding terminal 92, a Schottky diode 64 connected at the anode thereof to the cathode of the Schottky diode 62, a Pch-FET 65 connected at the drain thereof to the cathode of the Schottky diode 62and also connected in parallel to the Schottky diode 64, a resistor 66, a resistor 67 connected to the resistor 66, cathode of the Schottky diode 64 and source and gate of the Pch-FET 65, a Zener diode 68 connected at the cathode thereof to the cathode of the Schottky diode 64 and source of the Pch-FET 65 and at the anode thereof to the gate of the Pch-FET 65, and a capacitor 69 connected to the cathode of the Schottky diode 64 and source and gate of the Pch-FET 65. Note that the resistor 67, Zener diode 68 and capacitor 69 are connected in parallel to each other.

Furthermore, the cable apparatus 60 comprises a transistor 70 connected at the base thereof to the FET controller 91, at the collector thereof to a resistor 73 and at the emitter thereof to a grounding terminal 92, a Schottky diode 71 connected at the anode thereof to the cathode of the Schottky diode 62, a Pch-FET 72 connected at the drain thereof to the cathode of the Schottky diode 62 and in parallel to the Schottky diode 71, a resistor 74 connected to the resistor 73, cathode of the Schottky diode 71 and to the source and gate of the Pch-FET 72, a Schottky diode 75 connected at the cathode thereof to the cathode of the Schottky diode 71 and source and gate of the Pch-FET 72, and further at the anode thereof to the gate of the Pch-FET 72, and a capacitor 76 connected to the cathode of the Schottky diode 71 and source and gate of the Pch-FET 72. Note that the resistor 74, Zener diode 75 and capacitor 76 are connected in parallel to each other.

In addition, the cable apparatus 60 comprises a transistor 77 connected at the base thereof to the FET controller 91, at the collector thereof to a resistor 80 and at the emitter thereof to a grounding terminal 92, a Schottky diode 78 connected at the anode thereof to the cathode of the Schottky diode 62, a Pch-FET 79 connected at the drain thereof to the cathode of the Schottky diode 62 and also connected in parallel to the Schottky diode 78, a resistor 81 connected to the resistor 80, cathode of the Schottky diode 78 and to the source and gate of the Schottky diode 79, a Zener diode 82 connected at the cathode thereof to the cathode of the Schottky diode 78 and source of the Pch-FET 79 and at the anode thereof to the gate of the Pch-FET 79, and a capacitor 83 connected to the cathode of the Zener diode 78 and source and gate of the Pch-FET 79. Note that the resistor 81, Zener diode 82 and capacitor 83 are connected in parallel to each other.

Also, the cable apparatus 60 comprises a fuse 84 connected to the cathode of the Schottky diode 64 and source of the Pch-FET 65, a fuse 85 connected to the cathode of the Schottly diode 71 and source of the Pch-FET 72, a fuse 86 connected to the cathode of the Schottky diode 78 and source of the Pch-FET 79, a terminal a of a connector 87 connected to the fuse 84, a terminal a of a connector 88 connected to the fuse 85, a terminal a of a connector 89 connected to the fuse 86, the terminals a of the connectors 87, 88 and 89 being connected to a grounding terminal 92.

Figure 10:
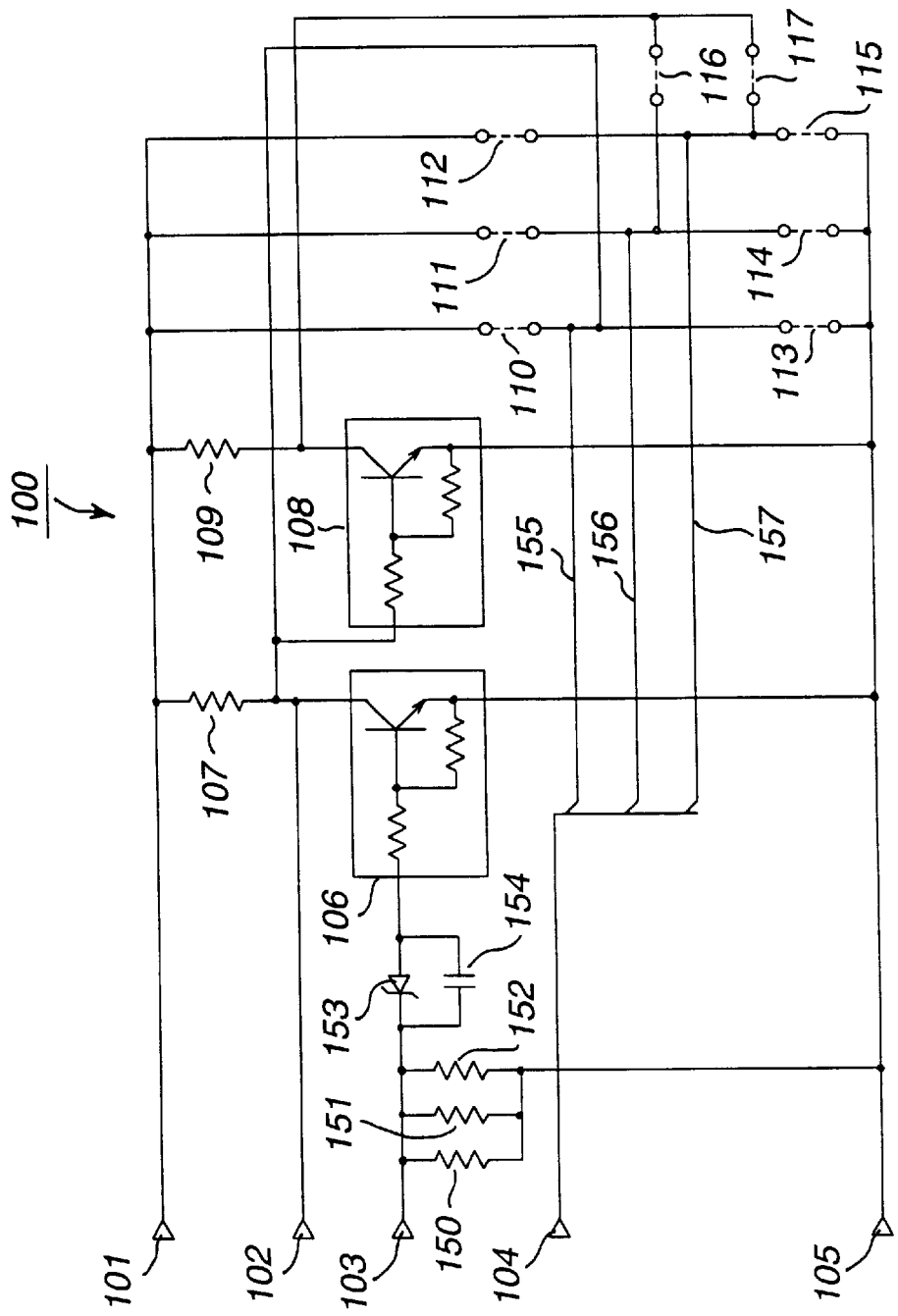
FIG. 10 is a wiring diagram of a power class controller used along with the second embodiment of cable apparatus according to the present invention.

Moreover, the cable apparatus 60 comprises a provider flag terminal 90 connected to a provider flag terminal 103 of a power class controller 100 shown in FIG. 10, an FET controller 102 connected to the FET controller 91, the grounding terminal 92 being connected to the grounding terminal 6.

The cable apparatus having the aforementioned construction functions as will be described below:

First, when the cable apparatus-oriented power supply unit 2 has its power supply jack 61 plugged therein, it supplies an internal power to the terminal a of the connector 87 via the power supply jack 61, Schottky diode 62, Schottky diode 64 and a parasitic diode of the Pch-FET 65, and the fuse 84.

At this time, the FET controller 91 will provide a low output. Therefore, the current will not flow from the base to emitter of the transistor 63 and so not from the collector to emitter of the transistor 63. Since the current will not flow from the resistor 67 to the resistor 66, it will not flow to the gate of the Pch-FET 65.

Therefore, the current will not flow from the source to drain of the Pch-FET 65 since the latter is off. Namely, the connectors 87, 88 and 89 are at a high impedance when the power supply jack 61 is supplying the internal power.

Since the terminals a of the connectors 88 and 89 are connected to the power supply jack 61 along the similar route as in the above, when the internal power is supplied, it will be supplied along the same route as for the terminal a of the connector 87.

Next, when the power supply unit 2 for the cable apparatus 60 does not have the power supply jack 61 plugged therein, it will not supply any internal power to the terminal a of the connector 87 along the same route as in the above. In this case, the cable apparatus 60 cannot be supplied with any internal power but is supplied with an external power from each of the connectors, and thus it is in such as to be able to supply and receive the external power between the connectors. Namely, the cable apparatus 60 is not supplied with any internal power from the power supply unit 2 but can be supplied with the external power from the terminal a of the connector 87.

At this time, the FET controller 91 provides a high output. Thus, the current will flow from the base to emitter of the transistor 63, and so from the collector to emitter. Since the current flows from the resistor 67 towards the resistor 66, it will also flow to the gate of the Pch-FET 65.

Therefore, the Pch-FET 65 is on, so the current will flow from the source to drain of the Pch-FET 65. Namely, the connectors 87, 88 and 89 are at a low impedance in relation to each other while the internal power is being supplied through the power supply jack 61.

For example when the connector 87 is supplied with an external power, it will supply the external power from the terminal a thereof to the terminal a of the connector 88 via the fuse 84, source and drain of the Pch-FET 65, Schottky diode 71, parasitic diode of the Pch-FET 72 and the fuse 85, and to the terminal a of the connector 89 via the fuse 84, source and drain of the Pch-FET 65, Schottky diode 78, diode of the Pc-FET 79 and the fuse 86, respectively.

The terminals a of the connectors 88 and 89 can supply and receive an external power between the connectors along the same route as in the above. So, when an external power is supplied, the external power is supplied to each of the connectors along the same route as for the terminal a of the connector 87.

Thus, when an external power is supplied to each of the connectors 87, 88 and 89 at the terminal a thereof with an external power, it can be supplied and received between the connectors and delivered to outside from them.

Therefore, the connectors 87, 88 and 89 can supply and receive a power between predetermined interface devices, namely, between the connectors themselves.

Finally, the power class controller 100 will be described in further detail below with reference to FIG. 10:

It should be noted that the power class controller 100 stands for the power class controller 7 having previously been described with reference to FIG. 3. The malfunction preventive circuit A in FIG. 5 is not shown in FIG. 10.

As shown in FIG. 10, the power class controller 100 comprises a power terminal 101 connected to the power supply unit 4 for the PHY circuit 5, an FET controller 102 connected to the FET controller 91, a provider flag terminal 103 connected to the provider flag terminal 90, a power class output terminal group 104 connected to the PHY circuit 5, and a grounding terminal 105 connected to the grounding terminal 6.

The power class controller 100 further comprises resistors 150, 151 and 152 connected to the provider flag terminal 103 and in parallel to each other, a Zener diode 153 connected at the cathode thereof to the provider flag terminal 103, and a capacitor 154 connected to the provider flag terminal 103 and in parallel to the Zener diode 153 and which acts to kill any noise developed by the Zener diode 153 in operation.

The Zener voltage of the Zener diode 153 should be higher than a voltage dropped across the resistors 150, 151 and 152 while being lower than the lowest one prescribed in the IEEE 1394 standard or the voltage from the cable apparatus-oriented power supply unit 2.

In addition, the power class controller 100 comprises a transistor 106 connected at the base thereof to the anode of the Zener diode 153 and capacitor 154, at the collector thereof to a resistor 107 connected to the power terminal 101, and at the emitter thereof to the grounding terminal 105, and a transistor 108 connected at the base thereof to the resistor 107, at the collector thereof to a resistor 109 connected to the power terminal 101 and at the emitter thereof to the grounding terminal 105.

Moreover, the power class controller 100 comprises jumpers 110, 111, 112 connected to the power terminal 101, a jumper 113 connected to the jumper 110 and resistor 107, a jumper 114 connected to the jumper 111 and a jumper 116 connected to the resistor 109, a jumper 115 connected to the jumper 112 and a jumper connected to the resistor 109, a jumper 117 connected to the resistor 109, and wires 155, 156 and 157 connected to the power class output terminal group 104 and in parallel to each other.

Note that the PHY controller functions with a power class setting in accordance with the IEEE 1394 standard as having previously been described concerning the second embodiment of the present invention.

Four "installed" or "not-installed" states of the components including from the transistor 106 to the jumper 117 of the power class controller 100 will be described below.

When the cable apparatus-oriented power supply unit 2 can supply the terminals a of the connectors 87, 88 and 89 with an internal power of 15 W, the output of the power class output terminal group 104 is set for an output "001".

When the transistor 106, resistor 107, transistor 108, resistor 109, and jumpers 114 and 117 are in the installed status while the jumpers 110 to 113 and jumpers 115 and 116 are in the not-installed status, the power class controller 100 will set the power class of "001" for the power class output terminal group 104 to provide a power class output which will allow the cable apparatus-oriented power supply unit 2 to supply an internal power of 15 W to the terminals a of the connectors 87, 88 and 89.

The above operation will be described below with reference to FIG. 10. The provider flag terminal 103 is supplied with an internal power from the cable apparatus-oriented power supply unit 2. Thus, the voltage is applied to the cathode of the Zener diode 153 and the resistors 150, 151 and 152. Since these resistors 150, 151 and 152 are adapted for a small drop of the voltage, this voltage is also applied to the anode of the Zener diode 153. Since the transistor 106 is applied with the voltage because the anode of the Zener diode 153 is connected to the base of the. transistor 106, it is turned on. The collector of the transistor 106 will be at the same potential as the grounding terminal 105 since the transistor 106 is on. Therefore, the collector of the transistor 106 takes a potential which will be developed when the power class is set to "0".

Since the transistor 106 is on, the base of the transistor 108 connected to the collector of the transistor 106 is at the same potential as the grounding terminal 105. Thus, the transistor 108 will be off. The collector of the transistor 108 has the same potential as the power terminal 101 since the power voltage from the power terminal 101 passes through the resistor 109 because the transistor 108 is off Therefore, the collector of the transistor 108 takes a potential which will be developed when the power class is set to "1".

Since the wire 155 of the power class output terminal group 104 is connected to the collector of the transistor 106, it provides an output "0". The wire 156 of the power class output terminal group 104 is connected to the grounding terminal 105 via the jumper 114 and thus provides an output "0". Since the wire 157 of the power class output terminal group 104 is connected to the collector of the transistor 108 via the jumper 117, it provides an output "1".

Therefore, the power class output terminal group 104 will provide an output "001", and thus the power class is known to be appropriately set.

In case the cable apparatus-oriented power supply unit 2 cannot supply an internal power of 15 W to the terminals a of the connectors 87, 88 and 89 depending upon whether the relevant components are in the "installed" or "not-installed" status, the power class output terminal group 104 is set for an output cc "100".

The operation for this setting will be described with reference to FIG. 10. When the cable apparatus-oriented power supply unit 2 can supply no internal power, the provider flag terminal 103 will not be applied with any voltage. Therefore, the cathode of the Zener diode 153 will have the same potential as the grounding terminal 105 since it is connected to the grounding terminal 105 via the resistors 150, 151 and 152. The transistor 106 will be off because its base is at the same potential as the grounding terminal 105. Therefore, the collector of the transistor 106 takes a potential which will be developed when the power class is set to "1".

The base of the transistor 108 connected to the collector of the transistor 106 is at the same potential as the power terminal 101 since the power voltage from the power terminal 101 passes through the resistor 107 because the transistor 106 is off. The transistor 108 will be on since it is applied at its base with the power voltage from the power terminal 101. Thus, the collector of the transistor 108 will be at the same potential as the grounding terminal 105. Therefore, the collector of the transistor 108 takes a potential which will be developed when the power class is set to "0".

Since the wire 155 of the power class output terminal group 104 is connected to the collector of the transistor 106, it provides an output "1". The wire 156 of the power class output terminal group 104 is connected to the grounding terminal 105 via the jumper 114 and thus provides an output "0". Since the wire 157 of the power class output terminal group 104 is connected to the collector of the transistor 108 via the jumper 117, it provides an output "0".

Therefore, the power class output terminal group 104 provide an output "100", and thus the power class is known to be appropriately set.

When the power supply unit 2 for the cable apparatus 60 can supply an internal power of 30 W to the terminals a of the connectors 87, 88 and 89, the power class output terminal group 104 is set for an output "010".

When in the power class controller 100, the transistor 106, resistor 107, transistor 108, resistor 109, and jumpers 115 and 116 are in the "installed" status while the jumpers 110 to 114 and jumper 117 are in the "not-installed" status, the power class output terminal group 104 is set for an output "010" which allows the cable apparatus-oriented power supply unit 2 to supply the internal power of 30 W to the terminals a of the connectors 87, 88 and 89.

The above operation will be described below with reference to FIG. 10. The provider flag terminal 103 is supplied with an internal power from the cable apparatus-oriented power supply unit 2. Thus, the voltage is applied to the cathode of the Zener diode 153 and the resistors 150, 151 and 152. Since these resistors 150, 151 and 152 are adapted for a small drop of the voltage, this voltage is also applied to the anode of the Zener diode 153. Since the transistor 106 is applied with the voltage because the anode of the Zener diode 153 is connected to the base of the transistor 106, it is turned on. The collector of the transistor 106 will be at the same potential as the grounding terminal 105 since the transistor 106 is on. Therefore, the collector of the transistor 106 takes a potential which will be developed when the power class is set to "0".

Since the transistor 106 is on, the base of the transistor 108 connected to the collector of the transistor 106 is at the same potential as the grounding terminal 105. Thus, the transistor 108 will be off The collector of the transistor 108 has the same potential as the power terminal 101 since the power voltage from the power terminal 101 passes through the resistor 109 because the transistor 108 is off Therefore, the collector of the transistor 108 takes a potential which will be developed when the power class is set to "1".

Since the wire 155 of the power class output terminal group 104 is connected to the collector of the transistor 106, it provides an output "0". The wire 156 of the power class output terminal group 104 is connected to the collector of the transistor 108 via the jumper 116 and thus provides an output "1". Since the wire 157 of the power class output terminal group 104 is connected to the grounding terminal 105 via the jumper 115, it provides an output "0".

Therefore, the power class output terminal group 104 will provide an output "010", and thus the power class is known to be appropriately set.

In case the power supply unit 2 for the cable apparatus 60 cannot supply an internal power of 30 W to the terminals a of the connectors 87, 88 and 89 depending upon whether the relevant components are in the "installed" or "not-installed" status, the power class output terminal group 104 is set for an output "100".

The operation for this setting will be described with reference to FIG. 10. When the power supply unit 2 for the cable apparatus 60 can supply no internal power, the provider flag terminal 103 will not be applied with any voltage. Therefore, the cathode of the Zener diode 153 will have the same potential as the grounding terminal 105 since it is connected to the grounding terminal 105 via the resistors 150, 151 and 152. The transistor 106 will be off because its base is at the same potential as the grounding terminal 105. Therefore, the collector of the transistor 106 takes a potential which will be developed when the power class is set to "1".

The base of the transistor 108 connected to the collector of the transistor 106 is at the same potential as the power terminal 101 since the power voltage from the power terminal 101 passes through the resistor 107 because the transistor 106 is off. The transistor 108 will be on since it is applied at its base with the power voltage from the power terminal 101. Thus, the collector of the transistor 108 will be at the same potential as the grounding terminal 105. Therefore, the collector of the transistor 108 takes a potential which will be developed when the power class is set to "0".

Since the wire 155 of the power class output terminal group 104 is connected to the collector of the transistor 106, it provides an output "1". The wire 156 of the power class output terminal group 104 connected to the collector of the transistor 108 via the jumper 116 provides an output "0". Since the wire 157 of the power class output terminal group 104 is connected to the grounding terminal 105 via the jumper 115, it provides an output "0".

Therefore, the power class output terminal group 104 provide an output "100", and thus the power class is known to be appropriately set.

When the cable apparatus-oriented power supply unit 2 can supply an internal power of 45 W to the terminals a of the connectors 87, 88 and 89, the power class output terminal group 104 is set for an output "011".

When in the power class controller 100, the transistor 106, resistor 107, transistor 108, resistor 109, and jumpers 116 and 117 are in the "installed" status while the jumpers 110 to 115 are in the "not-installed" status, the power class output terminal group 104 is set for an output of "011" which allows the cable apparatus-oriented power supply unit 2 to supply the internal power of 45 W to the terminals a of the connectors 87, 88 and 89.

The above operation will be described below with reference to FIG. 10. The provider flag terminal 103 is supplied with an internal power from the cable apparatus-oriented power supply unit 2. Thus, the voltage is applied to the cathode of the Zener diode 153 and the resistors 150, 151 and 152. Since these resistors 150, 151 and 152 are adapted for a small drop of the voltage, this voltage is also applied to the anode of the Zener diode 153. Since the transistor 106 is applied with the voltage because the anode of the Zener diode 153 is connected to the base of the transistor 106, it is turned on. The collector of the transistor 106 will be at the same potential as the grounding terminal 105 since the transistor 106 is on. Therefore, the collector of the transistor 106 takes a potential which will be developed when the power class is set to "0".

Since the transistor 106 is on, the base of the transistor 108 connected to the collector of the transistor 106 is at the same potential as the grounding terminal 105. Thus, the transistor 108 will be off. The collector of the transistor 108 has the same potential as the power terminal 101 since the power voltage from the power terminal 101 passes through the resistor 109 because the transistor 108 is off Therefore, the collector of the transistor 108 takes a potential which will be developed when the power class is set to "1".

Since the wire 155 of the power class output terminal group 104 is connected to the collector of the transistor 106, it provides an output "0". The wire 156 of the power class output terminal group 104 connected to the collector of the transistor 108 via the jumper 116 provides an output "1". Since the wire 157 of the power class output terminal group 104 is connected to the collector of the transistor 108 via the jumper 117, it provides an output "1".

Therefore, the power class output terminal group 104 will provide an output "011", and thus the power class is known to be appropriately set.

In case the cable apparatus-oriented power supply unit 2 cannot supply an internal power of 45 W to the terminals a of the connectors 87, 88 and 89 depending upon whether the relevant components are in the "installed" or "not-installed" status, the power class output terminal group 104 is set for an output "100".

The operation for this setting will be described with reference to FIG. 10. When the cable apparatus-oriented power supply unit 2 can supply no internal power, the provider flag terminal 103 will not be applied with any voltage. Therefore, the cathode of the Zener diode 153 will have the same potential as the grounding terminal 105 since it is connected to the grounding terminal 105 via the resistors 150, 151 and 152. The transistor 106 will be off because its base is at the same potential as the grounding terminal 105. Therefore, the collector of the transistor 106 takes a potential which will be developed when the power class is set to "1".

The base of the transistor 108 connected to the collector of the transistor 106 is at the same potential as the power terminal 101 since the power voltage from the power terminal 101 passes through the resistor 107 because the transistor 106 is off The transistor 108 will be on since it is applied at its base with the power voltage from the power terminal 101. Thus, the collector of the transistor 108 will be at the same potential as the grounding terminal 105. Therefore, the collector of the transistor 108 takes a potential which will be developed when the power class is set to "0".

Since the wire 155 of the power class output terminal group 104 is connected to the collector of the transistor 106, it provides an output "1". The wire 156 of the power class output terminal group 104 is connected to the collector of the transistor 108 via the jumper 116 and thus provides an output "0". Since the wire 157 of the power class output terminal group 104 is connected to the collector of the transistor 108 via the jumper 117, it provides an output "0".

Therefore, the power class output terminal group 104 provides an output "100", and thus the power class is known to be appropriately set.

Note that the power class controller 100 will provide a signal of a power setting result from the power class output terminal group 104 to the PHY circuit 5 which will in turn control the power supply unit 4 for the PHY circuit 5 based on the result of power class setting.

As having been described in the foregoing, the cable apparatus according to the present invention can make a selection between supply of an internal power to a predetermined interface device and that of an external power to the interface device in compliance with the interface standard applied to the predetermined interface device.

Thus, the cable apparatus according to the present invention can provide a highly effective power saving since it is adapted such that the power is consumed only when an internal power is supplied via the power line while no power is consumed when an external power is supplied via the power line.

What is claimed is:

1. A cable apparatus comprising:

an internal power terminal for connection to an internal power source;

a plurality of external power terminals for receiving an externally supplied power;

a plurality of power lines for connection to the internal power source or to a respective plurality of externally supplied power; and power line selection controlling means for selecting, when an internal power is supplied from the internal power terminal, one of the plurality of power lines that connects the internal power terminal to the plurality of external power terminals and for selecting, when external power is supplied to one of the plurality of external power terminals, one of the plurality of power lines that connects the externally supplied power from the one of the plurality of external power terminals to another of the plurality of external power terminals, wherein the power line selection controlling means automatically changes a power class setting conforming to a standard for a high-performance serial bus to a first power class setting when the internal power is supplied via the power line and to a second power class setting when the external power is supplied via the power line.

2. The apparatus as set forth in claim 1, wherein the power line selection controlling means is operated by the internal power supplied by the internal power source.

3. The apparatus as set forth in claim 1, further comprising a switch, wherein when the internal power is supplied from the internal power source, the power line selection controlling means shifts the switch to a position to supply the internal power to the one of the plurality of external power terminals and, when the external power is supplied from any one of the external power terminals, the power line selection controlling means shifts the switch to a position to supply the external power from the one of the external power terminals to the other of the external power terminals.

4. A cable apparatus comprising an internal power terminal for connection to an internal power source;

a plurality of external power terminals for receiving externally applied power;

a plurality of power lines for connection to the internal power source or to a respective plurality of externally supplied power; and power line selection controlling means for selecting, when an internal power is supplied from the internal power terminal, one of the plurality of power lines that connects the internal power terminal to the plurality of external power terminals and for selecting, when external power is supplied to one of the plurality of external power terminals, one of the plurality of power lines that connects the externally supplied power from the one of the plurality of external power terminals to another of the plurality of external power terminals, wherein the power line selection controlling means includes power class setting means for automatically changing a power class setting conforming to a standard for high-performance serial bus in compliance with the internal power supplied to the plurality of power lines.

* * * * *